United States Patent [19]
Truax et al.

[11] Patent Number: 5,667,028
[45] Date of Patent: Sep. 16, 1997

[54] MULTIPLE DIAMOND LAYER POLYCRYSTALLINE DIAMOND COMPOSITE CUTTERS

[75] Inventors: David Truax; Roger Brown, both of Houston, Tex.

[73] Assignee: Smith International, Inc., Houston, Tex.

[21] Appl. No.: 518,036

[22] Filed: Aug. 22, 1995

[51] Int. Cl.⁶ ................................................. E21B 10/46
[52] U.S. Cl. ........................................ 175/428; 175/434
[58] Field of Search .............................. 175/420, 420.2, 175/428, 430, 434

[56] References Cited

U.S. PATENT DOCUMENTS

| | | | |
|---|---|---|---|
| 4,592,433 | 6/1986 | Dennis | 175/428 |
| 4,823,892 | 4/1989 | Fuller | 175/428 |
| 5,031,484 | 7/1991 | Packer | 76/108.6 |
| 5,238,074 | 8/1993 | Tibbitts et al. | 175/428 |
| 5,499,688 | 3/1996 | Dennis | 175/434 |

FOREIGN PATENT DOCUMENTS

| | | |
|---|---|---|
| 0177466 | 4/1986 | European Pat. Off. . |
| 2190412 | 11/1987 | United Kingdom . |
| 2204625 | 11/1988 | United Kingdom . |

*Primary Examiner*—William P. Neuder
*Attorney, Agent, or Firm*—Christie, Parker & Hale, LLP

[57] ABSTRACT

An improved polycrystalline diamond composite ("PDC") cutter comprising a single or a plurality of secondary PDC cutting surfaces in addition to a primary PDC cutting surface, wherein at least two of the cutting surfaces are non-abutting, resulting in enhanced cutter efficiency and useful life. The primary PDC cutting surface is a PDC layer on one end face of the cutter. The secondary PDC cutting surfaces are formed by sintering and compacting polycrystalline diamond in grooves formed on the cutter body outer surface. The secondary cutting surfaces can have different shapes such as circles, triangles, rectangles, crosses, finger-like shapes, or rings.

21 Claims, 4 Drawing Sheets

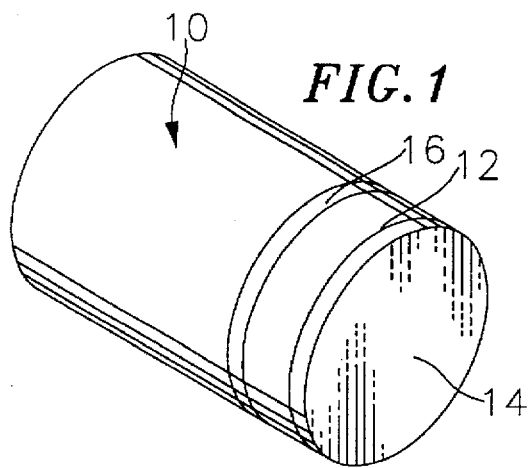
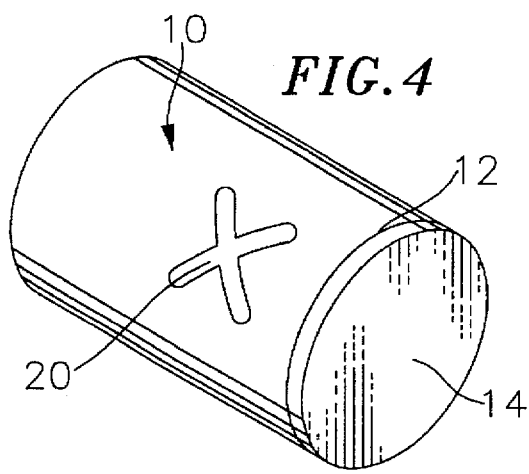
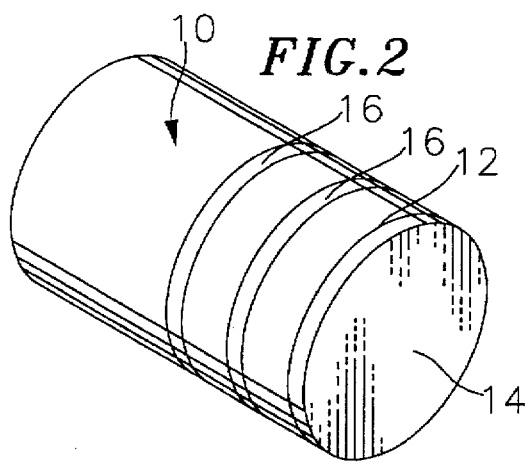
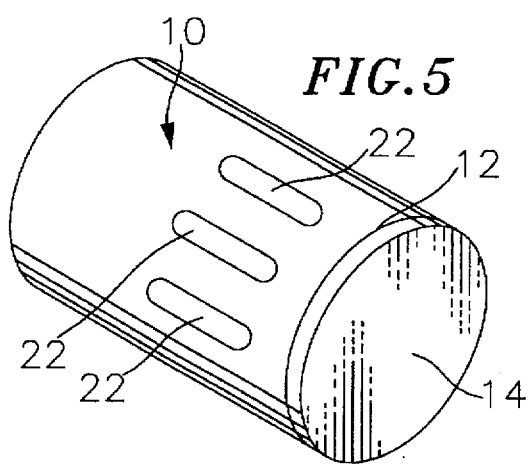
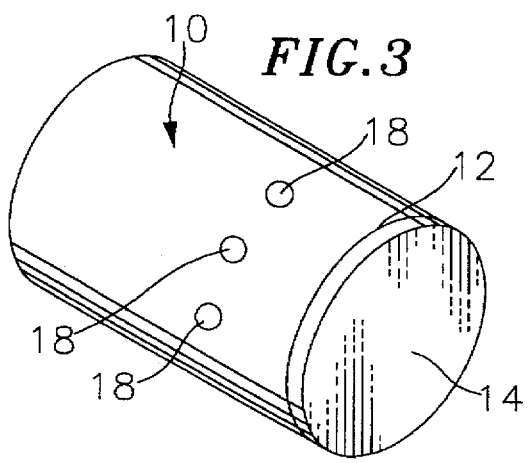
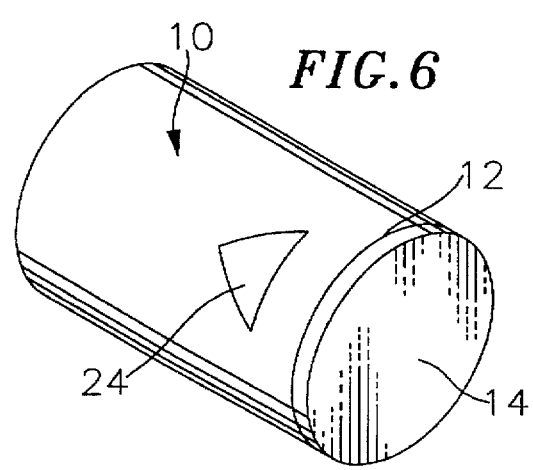

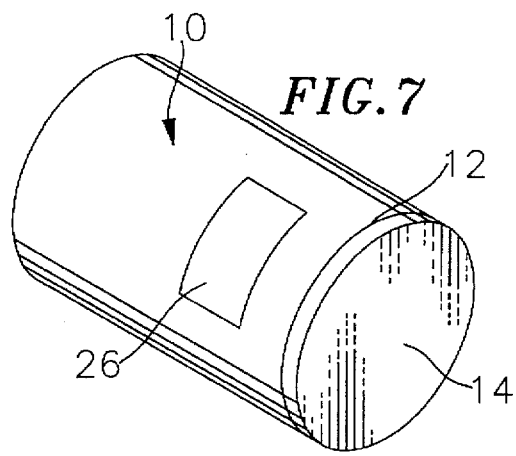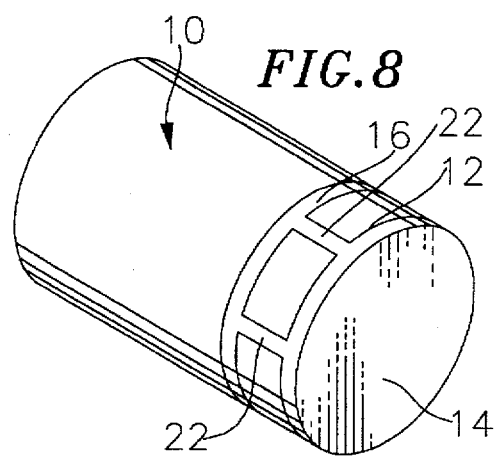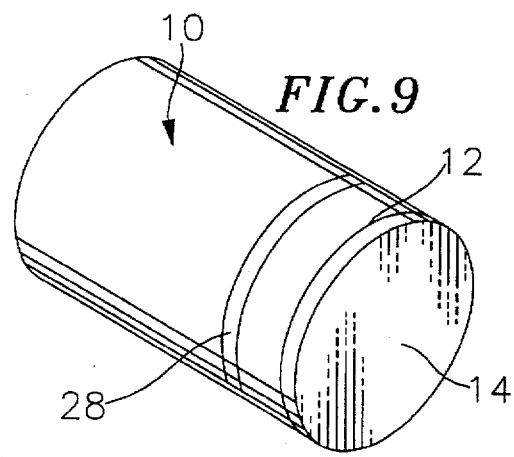

MULTIPLE DIAMOND LAYER POLYCRYSTALLINE DIAMOND COMPOSITE CUTTERS

BACKGROUND OF THE INVENTION

The present invention relates to polycrystalline diamond composite ("PDC") cutters used in drag bits for drilling bore holes in earth formations.

PDC cutters are well known in the art. They have a cemented tungsten carbide body and are typically cylindrical in shape. The cutting surface of the cutter is formed by sintering a PDC layer to a face of the cutter. The diamond layer serves as the cutting surface of the cutter. The cutters are inserted on a drag bit outer body 8 exposing at least a portion of the cutter body 10 and the diamond cutting surface 14 as shown in FIG. 10. Typically, the cutter makes contact with a formation at an angle, i.e., the diamond cutting layer is at an angle to the formation surface. As the bit rotates, the PDC cutting layer edge makes contact and "cuts" away at the formation. At the same time portions of the exposed cutter body also make contact with the formation surface. This contact erodes the cutter body. As the carbide body of the cutter erodes, less and less carbide material is available to support the diamond cutting layer, resulting in the eventual detachment and loss of the PDC cutting layer. Consequently, the cutter is disabled.

Furthermore, as the PDC cutter body erodes, the cutter which is tightly fitted into the bit body loosens and falls out. As the cutting process continues, the fallen cutter can come in contact with or lodge against the remaining cutters causing them to also fail.

Accordingly, there is a need for a cutter with increased resistance to body wear and erosion so as to prevent the detachment of the PDC cutting layer and the consequential "fall-out" of the cutter. There is also a need for a cutter which can still function after the diamond cutting layer is detached. Such a cutter will have an enhanced useful life resulting in less frequent cutter changes and in fewer drilling operation stoppages for replacing failed cutters.

SUMMARY OF THE INVENTION

An improved polycrystalline diamond composite ("PDC") drag bit cutter comprising multiple cutting surfaces, at least two of which are non-abutting, resulting in an enhanced useful life. Generally, PDC cutters have a cylindrical shape. The cutting surface of a PDC cutter is formed by sintering polycrystalline diamond to the PDC cutter face. With the present invention secondary cutting surfaces are formed on the body of the PDC cutter. These cutting surfaces are formed by sintering polycrystalline diamond in grooves formed on the outer surface of the cutter body.

The secondary cutting surfaces take the shape of the formed grooves. Shapes of secondary cutting surfaces can comprise a plurality of spaced rings spanning the whole of a part of the PDC body circumference. These rings can be inter-connected by finger-like members which are also cutting surfaces. Other shapes of secondary cutting surfaces comprise a circular ("dot"-shaped) surface, a plurality of circular surfaces, a triangular surface, a rectangular surface or a cross-shaped surface.

BRIEF DESCRIPTION OF THE DRAWINGS

FIG. 1 is an isometric view of a PDC cutter with a ring-shaped secondary PDC cutting surface.

FIG. 2 is an isometric view of a PDC cutter with a plurality of ring-shaped secondary PDC cutting surfaces.

FIG. 3 is an isometric view of a PDC cutter with a plurality of "dot"-shaped secondary PDC cutting surfaces.

FIG. 4 is an isometric view of a PDC cutter with a cross-shaped secondary PDC cutting surface.

FIG. 5 is an isometric view of a PDC cutter with a plurality of finger-like secondary PDC cutting surfaces.

FIG. 6 is an isometric view of a PDC cutter with a triangular secondary PDC cutting surface.

FIG. 7 is an isometric view of a PDC cutter with a rectangular secondary PDC cutting surface.

FIG. 8 is an isometric view of a PDC cutter with a ring-shaped secondary PDC cutting surface and a plurality of finger-like PDC secondary cutting surfaces positioned cross-wise between the primary cutting surface and the ring-shaped cutting surface.

FIG. 9 is an isometric view of a PDC cutter with a half-ring-shaped secondary PDC cutting surface spanning half of the cutter circumference.

DETAILED DESCRIPTION OF THE PREFERRED EMBODIMENTS

Figure 10:
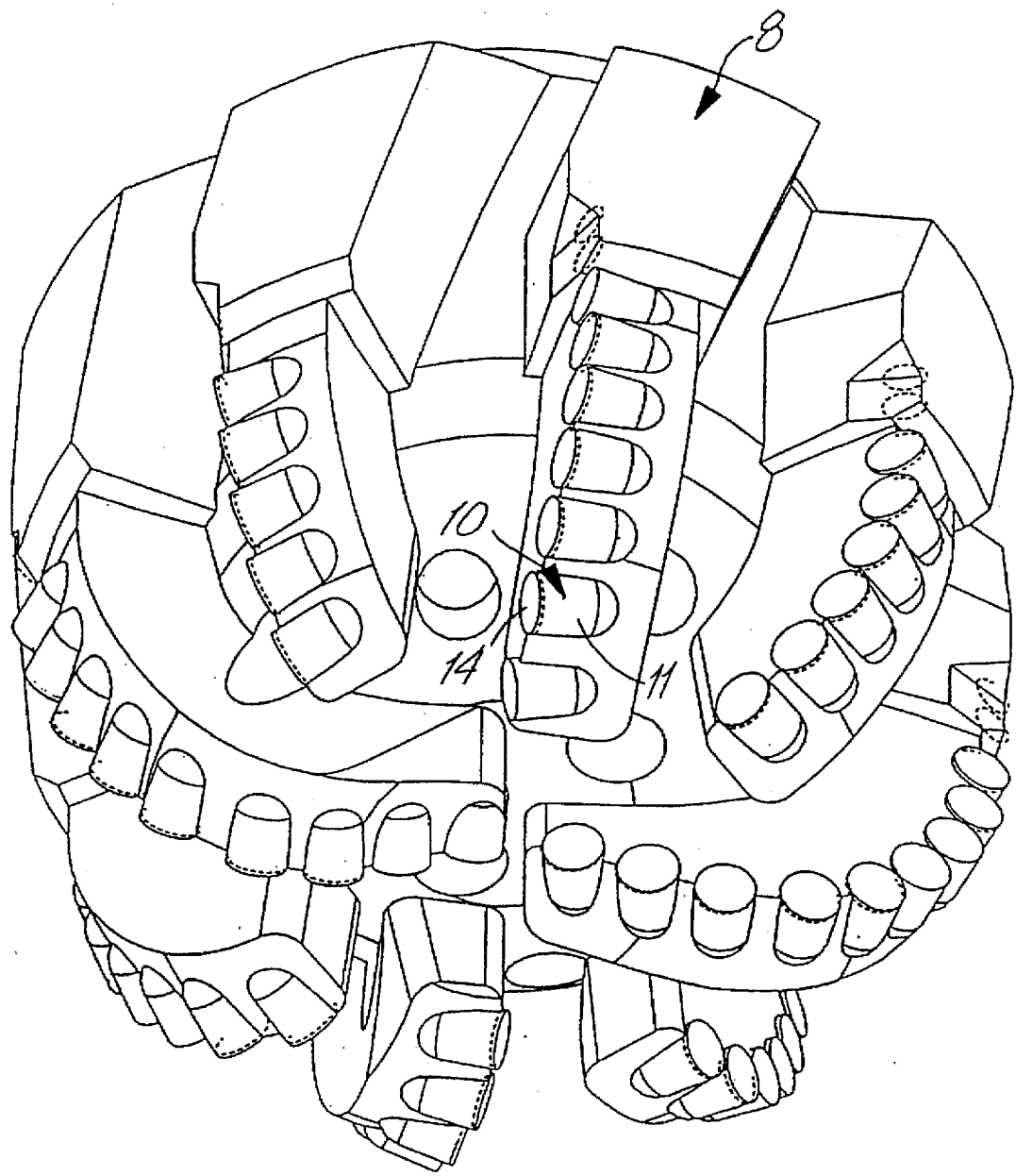
FIG. 10 is an isometric view of a drag bit with installed prior art PDC cutters.

The present invention is an improved polycrystalline diamond composite ("PDC") cutter comprising multiple PDC cutting surfaces, at least two of which are non-abutting, resulting in enhanced cutter useful life and increased cutter efficiency.

Generally PDC cutters have a carbide body 10 having a cylindrical shape with a cutting face 12 (FIGS. 1–9). A PDC layer 14 is sintered on the cutting face of the cutter (FIGS. 1–9). While the present invention is described herein based on a cylindrical-shaped cutter, the invention is equally applicable to other shapes of cutters. In the present invention, the PDC layer forms a primary cutting surface. Additional cutting surfaces (referred herein as "secondary" cutting surfaces) are formed on the PDC carbide body. These secondary cutting surfaces can span the whole or a portion of the circumference of the cutter body. In many situations, the secondary cutting surfaces span only the portion of the cutter body exposed to the earth formation during drilling.

To form the secondary cutting surfaces, grooves are formed on the cutter body outer surface. Diamond crystals are compacted into the grooves and the cutter is processed in a high pressure, high temperature press to form polycrystalline diamonds in the grooves. The process of forming the grooves and the subsequent process of sintering and compacting polycrystalline diamond in these grooves is known in the art. For example, U.S. Pat. No. 5,031,484 describes a process for fabricating helically fluted end mills with PDC cutting surfaces by sintering and compacting polycrystalline diamond in helically formed grooves in fluted end mills. Generally speaking, the grooves for polycrystalline diamond have a half round cross section without sharp corners. Typically a groove may be 0.060 inch wide and 0.050 inch deep.

Secondary cutting surfaces can be in the shape of rings 16 which are parallel to the primary cutting surface, and span the circumference of the cutter (FIGS. 1 and 2). A single ring or multiple rings can span the entire circumference of the cutter body or only a portion of it. For example, a further embodiment utilizes a half ring (or band) 28 which spans half of the circumference of the cutter and which is parallel to the primary PDC cutting surface (FIG. 9). In another embodiment, the secondary ring surface and the primary cutting surface are inter-connected with finger-like cutting surfaces 22 which are parallel to each other and perpendicular to the ring and the primary cutting surface 14 (FIG. 8). In embodiments using multiple secondary ring cutting surfaces, the rings can also be inter-connected with finger-like cutting surfaces.

In a further embodiment, the secondary cutting surfaces can be in the form of "dots" 18 which are generally equidistant from the primary diamond layer cutting surface and which are equally spaced (FIG. 3). These "dots" can span the entire circumference of the cutter or can span only a portion of the cutter circumference.

Another embodiment utilizes longitudinal finger-like cutting surfaces 22 which are parallel to each other and perpendicular to the primary diamond cutting surface 14. These finger-like cutting surfaces can be equally spaced and can span the entire circumference of the cutter body or only a portion of it (FIG. 5).

In yet a further embodiment, the secondary cutting surface has a triangular shape 24 (FIG. 6). Instead of a triangular cutting surface, a rectangular cutting surface 26 (FIG. 7) or a cross-shaped surface 20 (FIG. 4) can also be incorporated. Other shapes of cutting surfaces can also be used.

A secondary cutting surface serves two purposes. First, it serves as an additional cutting surface, increasing the cutting efficiency of the cutter. Second, it delays the erosion and wear of the cutter body that occurs when the cutter body is allowed to make contact with the earth formations during drilling.

Figure 11:
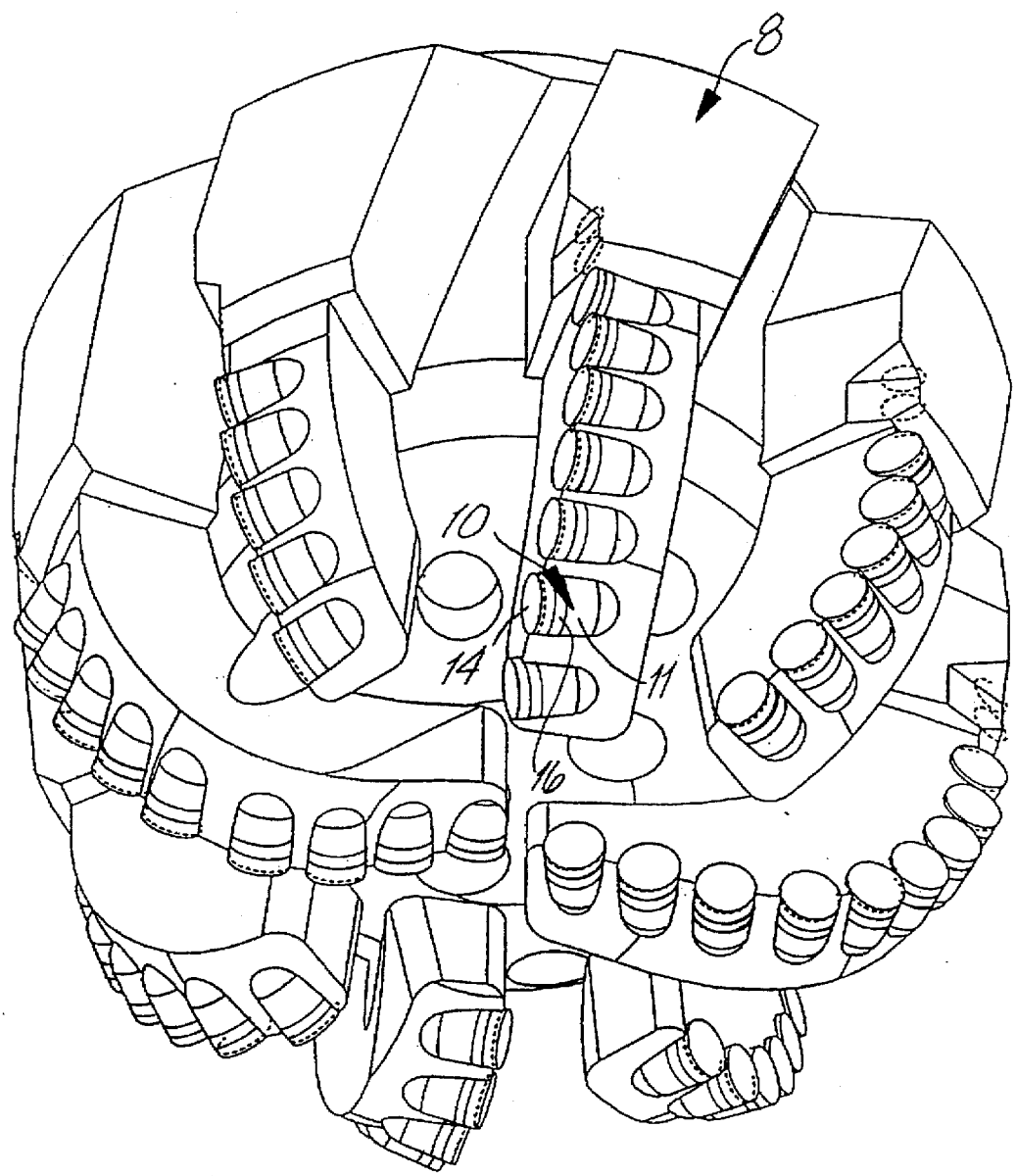
FIG. 11 is an isometric view of a drag bit with installed PDC cutters having a primary and a secondary cutting surface.

PDC cutters are sometimes inserted on a drag bit outer body at an angle exposing the primary cutting surface 14 and a portion 11 of the cutter body 10 (FIG. 10). As the bit rotates during the drilling process, the primary PDC cutting surface 14 makes contact with the formation first, followed by contact of the exposed cutter body portion 11. With the present invention, contact of the primary cutting surface with the earth formations is followed by contact of the secondary cutting surface (shown as ring 16 in FIG. 11) which is formed on the cutter exposed outer surface. As the secondary cutting surface makes contact with the formations, it prevents the portion of the exposed cutter body surrounding the secondary cutting surface from making contact with the formation and, therefore, slows down the cutter body erosion.

As a result, the period of time it takes for the cutter body to wear down to a point where the primary PDC cutting surface 14 detaches from the cutter is prolonged, resulting in enhanced cutter life. Furthermore, the retardation of cutter body erosion ensures that cutters remain tightly fitted into the cutter bit longer, decreasing the frequency of cutter "fall-out." In addition, with this improved PDC cutter, even if the primary PDC cutting layer detaches or fails, the cutter can still function (i.e., cut) using the secondary cutting surfaces.

Having now described the invention as required by the patent statutes, those skilled in the art will recognize modifications and substitutions to the elements of the embodiment disclosed herein. For example, a secondary cutting surface may be employed on a cylindrical compact brazed to a cutter stud as used in some types of rock bits. Such modifications and substitutions are within the scope of the present invention as defined in the following claims.

What is claimed is:

1. A PDC cutter comprising:
   a cylindrical body of cemented tungsten carbide;
   a polycrystalline diamond composite layer on a first end face of the cylindrical body extending to a circumferential edge of the first end face;
   a groove in the body spaced apart from the polycrystalline diamond composite layer; and polycrystalline diamond in the groove.

2. A PDC cutter as recited in claim 1 wherein the groove and polycrystalline diamond in the groove have a shape on the cylindrical surface of the body selected from the group consisting of a ring extending circumferentially around the body, a band extending circumferentially part way around the body, finger-like shapes extending longitudinally on the body, a plurality of dots, a cross, a triangle, and a rectangle and combinations thereof.

3. A cylindrical PDC cutter having a cutting face and an outer surface, and comprising a PDC layer on the cutting face extending to a circumferential edge of the cutting face and forming a primary PDC cutting surface, and polycrystalline diamond sintered and compacted in a groove formed on the body outer surface forming a secondary PDC cutting surface, non-abutting to the primary cutting surface and having the shape of the groove.

4. A PDC cutter as recited in claim 3 wherein the secondary cutting surface is rectangular.

5. A PDC cutter recited in claim 3 comprising a plurality of finger-like PDC secondary cutting surfaces formed on the outer surface of the PDC cutter.

6. A PDC cutter as recited in claim 5 wherein the secondary cutting surfaces are longitudinally formed.

7. A PDC cutter having a cylindrical body comprising a PDC layer on a body first end face extending to a circumferential edge of the first end face and forming a cutting surfaces formed by sintering and compacting polycrystalline diamond in grooves formed on the body outer surface, wherein at least one of the secondary cutting surfaces is spaced apart from the primary cutting surface.

8. A drag bit comprising a plurality of cylindrical cemented tungsten carbide PDC cutters having two end faces, wherein the PDC cutters are inserted on the bit outer body so that a portion of each PDC cutter including an end face is exposed, wherein each PDC cutter comprises PDC layer extending to a circumferential edge of the end face and a primary PDC cutting surface on the exposed end face and a secondary PDC cutting surface formed on a groove on the exposed portion of the cutter body, wherein the secondary cutting surface is spaced apart from the primary cutting surface.

9. A drag bit as recited in claim 8 wherein the secondary cutting surface of each PDC cutter can have a shape selected from the group consisting of a ring extending circumferentially around the body, a band extending circumferentially part way around the body, finger-like shapes extending longitudinally on the body, a plurality of dots, a cross, a triangle, and rectangle and combinations thereof.

10. A PDC cutter comprising:
    a cylindrical body of cemented tungsten carbide;
    a polycrystalline diamond composite layer on one end face of the cylindrical body;
    a circumferentially extending groove in the body forming a band and spaced apart from and parallel to the layer; and
    polycrystalline diamond in the groove.

11. A PDC cutter as recited in claim 10 wherein the band extends around only a portion of the circumference of the body.

12. A PDC cutter as recited in claim 10 further comprising a plurality of fingers of polycrystalline diamond extending between the layer and the polycrystalline diamond in the groove.

13. A PDC cutter comprising:

cylindrical body of cemented tungsten carbide;

polycrystalline diamond composite layer on one end face of the cylindrical body;

a groove in the body spaced apart from the polycrystalline diamond composite layer and having a shape selected from the group consisting of a ring extending circumferentially around the body, a band extending circumferentially part way around the body, finger-like shapes extending longitudinally along only a portion of the body, a plurality of dots, a cross, a triangle, and a rectangle spanning only a portion of a length of the body, and combinations thereof.

14. A cylindrical PDC cutter having a cutting face and an outer surface and comprising a PDC layer on the cutting face forming a primary PDC cutting surface, and polycrystalline diamond sintered and compacted in a groove formed on the body outer surface, for forming a secondary non-abutting PDC cutting surface, the groove forming a circumferential ring.

15. A PDC cutter as recited in claim 14 further comprising a plurality of finger-like PDC cutting surfaces formed perpendicularly between the primary and ring-shaped cutting surfaces forming additional cutting surfaces.

16. A PDC cutter as recited in claim 14 wherein the PDC ring-shaped cutting surface spans only a portion of the PDC cutter circumference.

17. A cylindrical PDC cutter having a cutting face and an outer surface and comprising a PDC layer on the cutting face forming a primary PDC cutting surface, and polycrystalline diamond sintered and compacted in a circular groove to form on the body outer surface forming a secondary non-abutting PDC cutting surface having a circular shape.

18. A PDC cutter as recited in claim 17 further comprising a plurality of circular PDC secondary cutting surfaces formed on the PDC cutter outer surface.

19. A cylindrical PDC cutter having a cutting face and an outer surface and comprising a PDC layer on the cutting face forming a primary PDC cutting surface, and polycrystalline diamond sintered and compacted in a triangular groove on the body outer surface forming a triangular secondary non-abutting PDC cutting surface.

20. A cylindrical PDC cutter having a cutting face and an outer surface and comprising a PDC layer on the cutting face forming a primary PDC cutting surface, and polycrystalline diamond sintered and compacted in a cross-shaped groove formed on the body outer surface forming a secondary non-abutting PDC cutting surface having a cross-shape.

21. A drag bit comprising a plurality of cylindrical cemented tungsten carbide PDC cutters having two end faces, wherein the PDC cutters are inserted on the outer body so that a portion of each PDC cutter including an end face is exposed, wherein each PDC cutter comprises a primary PDC cutting surface on the exposed end face and a secondary PDC cutting surface formed on a groove on the exposed portion of the cutter body, the groove having a shape selected from the group consisting essentially of a ring extended circumferentially around the body, a band extending circumferentially part way around the body, finger-like shapes extending longitudinally along only a portion of the body, a plurality of dots, a cross, a triangle, and a rectangle spanning only a portion of a length of the body, and combinations thereof, wherein the secondary cutting surface is spaced apart from the primary cutting surface.

* * * * *